US012566613B2

(12) United States Patent
Tran

(10) Patent No.: US 12,566,613 B2
(45) Date of Patent: Mar. 3, 2026

(54) MICROPROCESSOR WITH SPECULATIVE AND IN-ORDER REGISTER SETS

(71) Applicant: Simplex Micro, Inc., Austin, TX (US)

(72) Inventor: Thang Minh Tran, Austin, TX (US)

(73) Assignee: Simplex Micro, Inc., Austin, TX (US)

( * ) Notice: Subject to any disclaimer, the term of this patent is extended or adjusted under 35 U.S.C. 154(b) by 116 days.

(21) Appl. No.: 18/388,908

(22) Filed: Nov. 13, 2023

(65) Prior Publication Data

US 2025/0156189 A1    May 15, 2025

(51) Int. Cl.
*G06F 9/38* (2018.01)

(52) U.S. Cl.
CPC ............ *G06F 9/3842* (2013.01); *G06F 9/384* (2013.01)

(58) Field of Classification Search
CPC ....... G06F 9/3836; G06F 9/384; G06F 9/3842
See application file for complete search history.

(56) References Cited

U.S. PATENT DOCUMENTS

| | | | |
|---|---|---|---|
| 5,021,985 A | 6/1991 | Hu et al. |
| 5,185,868 A | 2/1993 | Tran |
| 5,187,796 A | 2/1993 | Wang et al. |
| 5,251,306 A | 10/1993 | Tran |
| 5,497,467 A | 3/1996 | Wakui et al. |
| 5,655,096 A | 8/1997 | Branigin |
| 5,689,653 A | 11/1997 | Karp et al. |
| 5,699,536 A | 12/1997 | Hopkins et al. |

| | | | |
|---|---|---|---|
| 5,799,163 A | 8/1998 | Park et al. |
| 5,802,386 A | 9/1998 | Kahle et al. |
| 5,809,268 A | 9/1998 | Chan |
| 5,835,745 A | 11/1998 | Sager et al. |
| 5,860,018 A | 1/1999 | Panwar |
| 5,870,579 A * | 2/1999 | Tan ....................... G06F 9/3861 |
| | | | 712/217 |
| 5,881,302 A | 3/1999 | Omata |
| 5,903,779 A | 5/1999 | Park |
| 5,903,919 A | 5/1999 | Myers |

(Continued)

FOREIGN PATENT DOCUMENTS

| | | | |
|---|---|---|---|
| EP | 0840213 A2 | 5/1998 |
| EP | 0902360 A2 | 3/1999 |

(Continued)

OTHER PUBLICATIONS

H. O. Kultala et al., "Exposed datapath optimizations for loop scheduling," 2017 International Conference on Embedded Computer Systems: Architectures, Modeling, and Simulation (SAMOS), Pythagorion, Greece, pp. 171-178 (Year: 2017).

(Continued)

*Primary Examiner* — Jyoti Mehta
(74) *Attorney, Agent, or Firm* — Appleton Luff

(57) ABSTRACT

A processor includes a time counter and a time-resource matrix and statically dispatches speculative and in-order instructions. The time counter increments periodically, for example, every clock cycle, and the resulting count is used to statically schedule instruction execution. The processor includes a speculative register rename unit and a non-speculative register rename unit to allow certain types of instructions to be executed speculatively while other instructions are executed non-speculatively.

15 Claims, 5 Drawing Sheets

(56) References Cited

U.S. PATENT DOCUMENTS

| | | | |
|---|---|---|---|
| 5,933,618 A * | 8/1999 | Tran | G06F 9/3863 |
| | | | 712/213 |
| 5,958,041 A | 9/1999 | Petolino, Jr. et al. | |
| 5,961,630 A | 10/1999 | Zaidi et al. | |
| 5,964,867 A | 10/1999 | Anderson et al. | |
| 5,974,538 A | 10/1999 | Wilmot, II | |
| 5,996,061 A | 11/1999 | Lopez-Aguado et al. | |
| 5,996,064 A | 11/1999 | Zaidi et al. | |
| 6,003,128 A | 12/1999 | Tran | |
| 6,016,540 A | 1/2000 | Zaidi et al. | |
| 6,035,389 A * | 3/2000 | Grochowski | G06F 9/3863 |
| | | | 712/216 |
| 6,035,393 A | 3/2000 | Glew et al. | |
| 6,065,105 A | 5/2000 | Zaidi et al. | |
| 6,247,113 B1 | 6/2001 | Jaggar | |
| 6,282,634 B1 | 8/2001 | Hinds et al. | |
| 6,304,955 B1 | 10/2001 | Arora | |
| 6,425,090 B1 | 7/2002 | Arimilli et al. | |
| 6,453,424 B1 | 9/2002 | Janniello | |
| 6,591,359 B1 | 7/2003 | Hass et al. | |
| 6,671,799 B1 | 12/2003 | Parthasarathy | |
| 6,959,379 B1 | 10/2005 | Wojcieszak et al. | |
| 7,069,425 B1 | 6/2006 | Takahashi | |
| 7,434,032 B1 | 10/2008 | Coon et al. | |
| 8,166,281 B2 | 4/2012 | Gschwind et al. | |
| 9,256,428 B2 | 2/2016 | Heil et al. | |
| 9,348,590 B1 | 5/2016 | Kashyap et al. | |
| 9,354,884 B2 * | 5/2016 | Comparan | G06F 9/3867 |
| 10,339,095 B2 | 7/2019 | Moudgill et al. | |
| 10,346,171 B2 * | 7/2019 | Gabor | G06F 9/384 |
| 10,437,595 B1 | 10/2019 | Kanapathipillai et al. | |
| 11,062,200 B2 | 7/2021 | Lie et al. | |
| 11,132,199 B1 | 9/2021 | Tran | |
| 11,144,319 B1 | 10/2021 | Battle et al. | |
| 11,163,582 B1 | 11/2021 | Tran | |
| 11,188,478 B1 | 11/2021 | Tran | |
| 11,204,770 B2 | 12/2021 | Tran | |
| 11,263,013 B2 | 3/2022 | Tran | |
| 11,467,841 B1 | 10/2022 | Tran | |
| 11,829,187 B2 | 11/2023 | Tran | |
| 11,954,491 B2 | 4/2024 | Tran | |
| 12,061,906 B2 | 8/2024 | Stephens et al. | |
| 2001/0004755 A1 | 6/2001 | Levy et al. | |
| 2003/0023646 A1 | 1/2003 | Lin et al. | |
| 2003/0135712 A1 | 7/2003 | Theis | |
| 2004/0073779 A1 | 4/2004 | Hokenek et al. | |
| 2004/0168045 A1 * | 8/2004 | Morris | G06F 9/3842 |
| | | | 712/225 |
| 2004/0236920 A1 | 11/2004 | Sheaffer | |
| 2004/0243894 A1 | 12/2004 | Smith et al. | |
| 2005/0038980 A1 * | 2/2005 | Rodgers | G06F 9/30152 |
| | | | 712/E9.061 |
| 2005/0251657 A1 | 11/2005 | Boucher | |
| 2006/0010305 A1 | 1/2006 | Maeda et al. | |
| 2006/0095732 A1 | 5/2006 | Tran et al. | |
| 2006/0218124 A1 | 9/2006 | Williamson et al. | |
| 2006/0259800 A1 | 11/2006 | Maejima | |
| 2006/0288194 A1 | 12/2006 | Lewis et al. | |
| 2007/0028078 A1 | 2/2007 | Harris et al. | |
| 2007/0038984 A1 | 2/2007 | Gschwind et al. | |
| 2007/0113058 A1 | 5/2007 | Tran et al. | |
| 2007/0113059 A1 | 5/2007 | Tran | |
| 2007/0255903 A1 | 11/2007 | Tsadik et al. | |
| 2007/0260856 A1 | 11/2007 | Tran et al. | |
| 2008/0114966 A1 * | 5/2008 | Begon | G06F 9/3863 |
| | | | 712/E9.046 |
| 2008/0294882 A1 | 11/2008 | Jayapala et al. | |
| 2009/0113192 A1 | 4/2009 | Hall et al. | |
| 2009/0158279 A1 | 6/2009 | Iino et al. | |
| 2009/0217020 A1 | 8/2009 | Yourst | |
| 2010/0049958 A1 | 2/2010 | Vaskevich et al. | |
| 2010/0064106 A1 | 3/2010 | Yamada et al. | |
| 2010/0306505 A1 | 12/2010 | Williamson et al. | |
| 2011/0099354 A1 | 4/2011 | Takashima et al. | |
| 2011/0153987 A1 | 6/2011 | Luke et al. | |
| 2011/0320765 A1 | 12/2011 | Karkhanis et al. | |
| 2012/0047352 A1 | 2/2012 | Yamana | |
| 2012/0060015 A1 | 3/2012 | Eichenberger et al. | |
| 2012/0124344 A1 | 5/2012 | Jarvis | |
| 2012/0151156 A1 | 6/2012 | Citron et al. | |
| 2013/0151816 A1 | 6/2013 | Indukuru et al. | |
| 2013/0297912 A1 | 11/2013 | Tran et al. | |
| 2013/0298129 A1 | 11/2013 | Rabinovitch et al. | |
| 2013/0346985 A1 | 12/2013 | Nightingale | |
| 2014/0059328 A1 | 2/2014 | Gonion | |
| 2014/0082626 A1 | 3/2014 | Busaba et al. | |
| 2015/0026435 A1 | 1/2015 | Muff et al. | |
| 2015/0089141 A1 | 3/2015 | Chen et al. | |
| 2015/0100754 A1 | 4/2015 | Reid et al. | |
| 2015/0212972 A1 | 7/2015 | Boettcher et al. | |
| 2015/0227369 A1 | 8/2015 | Gonion | |
| 2015/0331760 A1 | 11/2015 | Dalessandro et al. | |
| 2016/0092230 A1 | 3/2016 | Chen et al. | |
| 2016/0092238 A1 | 3/2016 | Codrescu et al. | |
| 2016/0275043 A1 | 9/2016 | Grochowski et al. | |
| 2016/0283240 A1 | 9/2016 | Mishra et al. | |
| 2016/0371091 A1 | 12/2016 | Brownscheidle et al. | |
| 2017/0177345 A1 | 6/2017 | Ould-Ahmed-Vall et al. | |
| 2017/0177354 A1 | 6/2017 | Ould-Ahmed-Vall | |
| 2017/0185407 A1 | 6/2017 | Shwartsman | |
| 2017/0357513 A1 | 12/2017 | Ayub et al. | |
| 2017/0371657 A1 | 12/2017 | Mahurin et al. | |
| 2018/0181400 A1 | 6/2018 | Scherbinin et al. | |
| 2018/0196678 A1 | 7/2018 | Thompto | |
| 2018/0253310 A1 | 9/2018 | Stephens | |
| 2018/0321938 A1 | 11/2018 | Boswell et al. | |
| 2019/0079764 A1 | 3/2019 | Diamond et al. | |
| 2019/0243646 A1 | 8/2019 | Anderson | |
| 2019/0303161 A1 | 10/2019 | Nassi et al. | |
| 2020/0004534 A1 | 1/2020 | Gurram et al. | |
| 2020/0004543 A1 | 1/2020 | Kumar et al. | |
| 2020/0065111 A1 | 2/2020 | Bouzguarrou et al. | |
| 2020/0089528 A1 | 3/2020 | Gutierrez et al. | |
| 2020/0125498 A1 | 4/2020 | Betts et al. | |
| 2020/0310796 A1 | 10/2020 | Pfister et al. | |
| 2020/0319885 A1 | 10/2020 | Eyole et al. | |
| 2020/0371810 A1 | 11/2020 | Lichtenau et al. | |
| 2020/0387382 A1 | 12/2020 | Tseng et al. | |
| 2021/0026639 A1 | 1/2021 | Tekmen et al. | |
| 2021/0200550 A1 | 7/2021 | Sivtsov et al. | |
| 2021/0208891 A1 | 7/2021 | Wen et al. | |
| 2021/0311743 A1 | 10/2021 | Tran | |
| 2021/0326141 A1 | 10/2021 | Tran | |
| 2021/0389979 A1 | 12/2021 | Tran | |
| 2022/0066760 A1 | 3/2022 | Chang et al. | |
| 2022/0326988 A1 | 10/2022 | Gunter et al. | |
| 2023/0068637 A1 | 3/2023 | Feiste et al. | |
| 2023/0130826 A1 * | 4/2023 | Segger | G06F 9/4825 |
| | | | 718/102 |
| 2023/0214218 A1 * | 7/2023 | Battle | G06F 9/3842 |
| | | | 712/234 |
| 2023/0244490 A1 | 8/2023 | Tran | |
| 2023/0244491 A1 | 8/2023 | Tran | |
| 2023/0367599 A1 | 11/2023 | Waterman et al. | |
| 2023/0393852 A1 | 12/2023 | Tran | |

FOREIGN PATENT DOCUMENTS

| | | | |
|---|---|---|---|
| EP | 0959575 A1 | 11/1999 | |
| WO | 0010076 A1 | 2/2000 | |
| WO | 0208894 A1 | 1/2002 | |
| WO | 0213005 A1 | 2/2002 | |
| WO | 2024015445 A1 | 1/2024 | |

OTHER PUBLICATIONS

PCT/US2024/02037, Written Opinion of the International Searching Authority, Dec. 11, 2024.
PCT/US2024/020737 International Search Report, Dec. 11, 2024.
Wang, Y., Jia, Z., Chen, R., Wang, M., Liu, D. and Shao, Z., Loop scheduling with memory access reduction subject to register con-

(56)                    References Cited

OTHER PUBLICATIONS straints for DSP applications. Softw. Pract. Exper., pp. 999-1026. (Year: 2014).
U.S. Appl. No. 17/588,315, filed Jan. 30, 2022, Thang Minh Tran.
U.S. Appl. No. 17/672,622, filed Feb. 15, 2022, Thang Minh Tran.
U.S. Appl. No. 17/697,865, filed Mar. 17, 2022, Thang Minh Tran.
U.S. Appl. No. 17/697,870, filed Mar. 17, 2022, Thang Minh Tran.
U.S. Appl. No. 17/713,569, filed Apr. 5, 2022, Thang Minh Tran.
U.S. Appl. No. 17/725,476, filed Apr. 20, 2022, Thang Minh Tran.
U.S. Appl. No. 17/829,909, filed Jun. 1, 2022, Thang Minh Tran.
Choi, W., Park, SJ., Dubois, M. (2009). Accurate Instruction Pre-scheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).
Diavastos, Andreas & Carlson, Trevor. (2021). Efficient Instruction Scheduling using Real-time Load Delay Tracking. (Year: 2021).
J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).
PCT/US23/27497: Written Opinion of the International Searching Authority.
Written Opinion of the International Searching Authority, PCT/S2022/052185.
Written Opinion of the International Searching Authority, PCT/US2023/018970.
Written Opinion of the International Searching Authority, PCT/US2023/018996.
Anonymous: "RISC-V—Wikipedia", Apr. 16, 2022 (Apr. 16, 2022), XP093142703, Retrieved from the Internet:URL:https://en.wikipedia.org/w/index.php?title=RISC-V&oldid=1083030760 [retrieved on Mar. 27, 2024].
PCT/US2023/018970, International Preliminary Report on Patentability, Jul. 18, 2024.
PCT/US2023/018996, International Preliminary Report on Patentability, Jul. 19, 2024.
PCT/US2023/018996, Written Opinion of the International Preliminary Examining Authority, Apr. 8, 2024.
PCTUS2023081682, Written Opinion of the International Searching Authority, Mar. 22, 2024.
Written Opinion of The International Preliminary Examining Authority, PCTUS2023/018970, Mar. 25, 2024.

* cited by examiner

Register Scoreboard 40

| | Wr V | Wr unkn | Funit | Wr time | Rd V | Rd unkn | Rd time |
|---|---|---|---|---|---|---|---|
| 39 | 1 | 0 | MUL | 27 | 0 | 1 | x |
| 38 | 1 | 0 | ALU0 | 25 | 1 | 1 | 22 |
| 16 | 1 | 0 | ALU1 | 33 | 1 | 1 | 28 |
| 1 | 1 | 0 | Divide | 27 | 1 | 1 | 25 |
| 0 | 1 | 0 | Load | 21 | 0 | 1 | x |
| | 42 | 43 | 44 | 46 | 49 | 47 | 48 |

Register File 60

Write Control

| Time | Reg |
|------|-----|
| 127 | x0 |
| 126 | x0 |
| . | x26 |
| . | x14 |
| 28 | x22 |
| 27 | x8 |
| 26 | x32 |
| 25 | x0 |
| . | x0 |
| 1 | x0 |
| 0 | x0 | time count

Read Control

| Time | Reg |
|------|-----|
| 127 | x0 |
| 126 | x0 |
| . | x27 |
| . | x11 |
| 27 | x7 |
| 26 | x27 |
| 25 | x5 |
| . | x0 |
| 2 | x0 |
| 1 | x0 |
| 0 | x0 | time count

MICROPROCESSOR WITH SPECULATIVE AND IN-ORDER REGISTER SETS

RELATED APPLICATIONS

This application is related to the following U.S. patent applications which are each hereby incorporated by reference in their entirety: U.S. patent application Ser. No. 17/588,315, filed Jan. 30, 2022, and entitled "Microprocessor with Time Counter for Statically Dispatching Instructions;" U.S. patent application Ser. No. 17/697,870, filed Mar. 17, 2022, and entitled "Multi-Threading Microprocessor with a Time Counter for Statically Dispatching Instructions; and U.S. patent application Ser. No. 17/725,476, filed Apr. 20, 2022, and entitled "Microprocessor With a Time Counter for Statically Dispatching Extended Instructions"

BACKGROUND

Technical Field

The present invention relates to the field of computer processors. More particularly, it relates to issuing and executing instructions based on a time count in a processor where the processor consists of a general-purpose microprocessor, a digital-signal processor, a single instruction multiple data processor, a processor, a graphics processor, or other type of microprocessor which executes instructions.

Technical Background

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from reservation stations or central windows. Designing an OOO superscalar microprocessor has consequently become a huge undertaking. Hundreds of instructions are issued to the execution pipeline where data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

The major contributions to the performance in a microprocessor arise from flow control and data dependency. Flow control is dependent on branch instructions and data dependency is mostly due to the load instruction, which can take many cycles to complete. An in-order microprocessor exhibits much better power dissipation while an OOO microprocessor exhibits much better performance. Load instructions are critical in microprocessor design wherein the OOO microprocessor fills the execution pipeline with other instructions during the many cycles required to fetch load data. If the load instruction takes 1 clock cycle to execute with certainty, then it is not necessary for OOO execution of instructions.

There is accordingly a need for a microprocessor that allows only certain instructions to be executed OOO and speculatively while other instructions are executed in-order.

SUMMARY

The disclosed embodiments provide a processor with a time counter and a method for statically dispatching instructions to an execution pipeline with preset execution times based on a time count from the counter. Disclosed embodiments provided a microprocessor that allows only branch, load, and store instructions to be executed OOO and speculatively while other instructions are executed in-order. Such a microprocessor allows for a much simpler design yet provides high performance for solving the long latency for load data as well as improving the control flow of branch instructions.

A disclosed approach to microprocessor design employs static scheduling of instructions. The static scheduling is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file. A time-resource matrix in a microprocessor may be logically organized as a number of rows, one row corresponding to a time count of the counter, with each row divided into a number of columns, one for each resource. In such an organization, the values in the columns represent the counts for each resource to indicate how many resources have been used by previous instructions in the execution pipeline.

In one embodiment a time counter increments periodically, for example, every clock cycle, and the resulting count is used to statically schedule instruction execution. Instructions have known throughput and latency times, and thus can be scheduled for execution based on the time count. For example, an add instruction with throughput and latency time of 1 can be scheduled to execute when any data dependency is resolved. If the time count is 5 and the add has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 9. The read buses, the ALUs, and the write buses are the resources represented in the time-resource matrix. After the add instruction is issued, the number of available read buses at time 8 is reduced by the number of valid source registers of the add instruction, the number of available ALUs at time 9 is reduced by 1, and the number of available write buses at time 9 is reduced by 1 for valid destination register of the add instruction. The add instruction is dispatched to the ALU execution queue with the preset execution times. The aforementioned resource availability adjustment results in subsequent instructions with a read time of 8 seeing fewer read buses, similarly for the ALU and the write buses at time 9. In one embodiment, the count value of a resource is an exact resource number to be used for the issued instruction. For example, if the number of write buses is 5, then the resource count of 0 indicates that the first write

3 bus is used for the issue instruction. The resource count for the write buses is incremented by 1 and the next instruction uses the second write bus.

The performance of a microprocessor is significantly impacted by load and branch instructions. In a conventional processor that performs full OOO execution of instructions, every destination register is renamed to remove any write-after-write (WAW) and write-after-read (WAR) data dependency. A register scoreboard is provided to address any read-after-write (RAW) data dependency. The disadvantage to such an approach is that the required number of physical registers, which is the total of architectural and temporary registers, can be huge thus impacting area, power, and access time. Register rename consists of (1) a register free list (RFL) where all available registers are kept and assigned to rename the destination registers of instructions, (2) a rename alias table (RAT) to keep track of the latest mapping of the architectural registers to the physical registers, and (3) an architectural register table (ART) for architectural states of all the architectural register. In the disclosed embodiments, an alternative is to rename only registers associated with speculative instructions but not the non-speculative instructions. Speculative execution refers to the capability where instructions can be executed and write data back to the register file and that the instructions can be cancelled and invalidated. The load and store instructions take many cycles to complete, i.e., 4 cycles if hit in the level 1 data cache to 100 cycles from main memory. The load and store instructions should be executed as soon as possible for performance of the microprocessor. A load instruction have a destination register and is renamed when issuing to the load execution queue. A store instruction does not have a destination register, so no register renaming is needed for the store instruction. The load and store instructions are sent to the load-store unit speculatively while other instructions wait for in-order execution. The load registers are renamed when the load instructions are issued and ready for execution. If the load instruction is cancelled by branch misprediction, then the rename alias table (RAT) can be reversed back to the state of the RAT at the time of branch misprediction. In one embodiment, the register renaming is done twice, first from issuing of speculative instructions to the execution pipeline, and second from issuing of all instructions (including the speculative instructions) as part of in-order issuing of instructions to the execution pipeline. If there is branch misprediction or exception, the RAT and RFL are reversed back to the in-order RFL and RAT.

In most cases, branch instructions do not have an associated destination register but if a destination register is specified in the branch instruction, then it is renamed similar to the load instructions. If the branch instruction is mispredicted, then subsequent instructions must be cancelled and not written back to the register file. The speculative instructions write to the register file but the renamed registers are reversed back to the point of branch misprediction or exception. The non-speculative instructions are prior to the branch or load/store instructions which have no issue.

In one embodiment, without register renaming, data dependency includes WAW and WAR. The register scoreboard must also include read time of registers for WAR data dependency checking. For example, in a typical OOO execution, the number of physical registers is 128 which includes 32 architectural registers and 96 temporary registers. In one embodiment, the number of temporary registers for load instructions is set at 8 registers for a total of 40 physical registers which is much less than required for full OOO executions.

4

BRIEF DESCRIPTION OF THE DRAWINGS

Aspects of the present invention are best understood from the following description when read with the accompanying figures.

DETAILED DESCRIPTION

Figure 1:
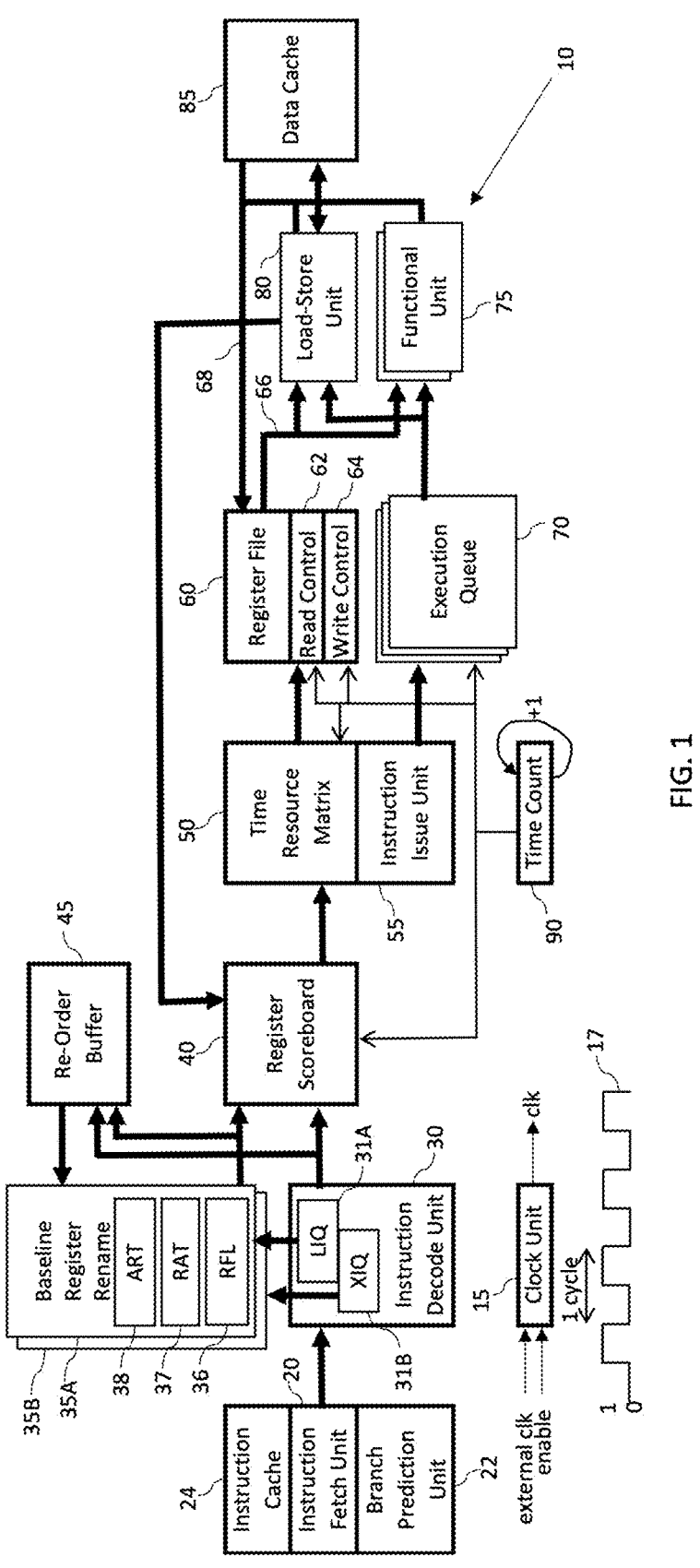
FIG. 1 is a block diagram illustrating a processor based data processing system in accordance with present invention.

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and a latency time of 2, the load instructions have the throughput time of 1 and a latency time of 3 (based on a data cache hit), and the divide instruction have throughput and latency times of 32.

FIG. 1 is a block diagram of a microprocessor based data processing system. The exemplary system includes a microprocessor 10 having a clock unit 15, an instruction fetch unit 20, a branch prediction unit 22, an instruction cache 24, an instruction decode unit 30, a register renaming unit 35 (comprising a register renaming unit 35A and a register renaming unit 35B), a register scoreboard 40, a re-order buffer 45, a time-resource matrix 50, an instruction issue unit 55, a register file 60, a read control unit 62, a write control unit 64, a plurality of execution queues 70, a plurality of functional units 75, a load-store unit 80, and a data cache 85. The microprocessor 10 includes a plurality of read buses 66 that couple the registers in the register file 60 to the functional units 75 and load-store unit 80. The system also includes a plurality of write buses 68 that transport data permitting the writing of write result data from the functional units 75, the load-store unit 80, and the data cache 85 to the register file 60. The microprocessor 10 is a synchronous microprocessor where the clock unit 15 generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronization of many different units and states in the microprocessor 10. The clock signal is used to sequence data and instructions through the units that perform the various computations in the microprocessor 10. The clock unit 15 may include an external clock as an input to synchronize the microprocessor 10 with external units (not shown). The clock unit 15 may further receive an enable signal to disable the clock unit when the microprocessor is in an idle stage or otherwise not used for instruction execution.

According to an embodiment, the microprocessor 10 also includes a time counter unit 90 which stores a time count incremented, in one embodiment, every clock cycle. The time counter unit 90 is coupled to the clock unit 15 and uses "clk" signal to increment the time count. In one embodiment the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in the next cycle (time count 27). The time counter unit 90 is coupled to the register scoreboard 40, the time-resource matrix 50, the read control 62, the write control 64, and the plurality of execution queues 70.

The register scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the corresponding scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time discussed below. The execution queue 70 is set to dispatch an instruction to a functional unit 75 or the load-store unit 80 at a preset time. In each case, the preset time is the time provided by the instruction decode unit 30. The preset time is a future time based on the time count, so when the time count counts up to the future preset time, then the specified action will happen, where the specified action is reading data from the register file 60, writing data to the register file 60, or issuing an instruction to a functional unit 75 for execution. The instruction decode unit 30 determines that the instruction is free of any data dependency. The resource is available to set the "preset time" for the instruction to be executed in the execution pipeline.

In the microprocessor system 10, the instruction fetch unit 20 fetches the next instruction(s) from the instruction cache 24 to send to the instruction decode unit 30. One or more instructions can be fetched per clock cycle from the instruction fetch unit depending on the configuration of microprocessor 10. For higher performance, an embodiment of microprocessor 10 fetches more instructions per clock cycle for the instruction decode unit 30. For low-power and embedded applications, an embodiment of microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled to the branch prediction unit 22 to generate a prediction of the next instruction address when a branch is detected and predicted by the branch prediction unit 22. The instruction fetch unit 20, the instruction cache 24, and the branch prediction unit 22 are described here for completeness of a microprocessor 10. In other embodiments, other instruction fetch, and branch prediction methods can be used to supply instructions to the instruction decode unit 30 for microprocessor 10.

The instruction decode unit 30 is coupled to the instruction fetch unit 20 to receive new instructions and is also coupled to the register renaming unit 35 and the register scoreboard 40. The instruction decode unit 30 decodes the instructions for instruction type, instruction throughput, latency times, and register operands. The register operands, for example, may consist of 2 source operands and 1 destination operand. The register scoreboard 40 records the write time and read times of the destination register and source registers, respectively, in reference to the time count 90. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution.

Other data dependencies for the instructions include the write-after-write (WAW) and write-after-read (WAR). The WAW data dependency occurs when 2 instructions write back to the same destination register. The WAW dependency restricts the later instruction from writing back to the same destination register before the earlier instruction is written to it. The destination register supports solving WAW data dependencies. If a later instruction has the same destination register as the destination register of an earlier instruction, then the later instruction has WAW data dependency. The later instruction must wait for completion of the earlier instruction before it can write to the same destination register. The destination register also supports solving WAR data dependencies. If a later instruction has the same destination register as a source register of an earlier instruction, then the later instruction has WAR data dependency. The later instruction must wait for the earlier instruction to read data from the register file 60 before it can write to the same source register.

In one embodiment, two register renaming units 35A and 35B are implemented to separately correspond to speculative instructions and in-order instructions. The register renaming units 35A and 35B are duplicated, they are implemented for timing purpose as the LIQ 31A and XIQ 31B are not necessarily physically in the proximity of each other. The speculative instructions are the branch, load and store instructions while the in-order instructions are all instructions that are retired by the re-order buffer 45. As the speculative instructions are fetched from instruction fetch unit 20 to the instruction decode unit 30, they enter both load instruction queue (LIQ) 31A and instruction queue (XIQ) 31B. Thus, the renaming mechanism for speculative instructions concurrently happens at the same time in both LIQ 31A and XIQ 31B. The LIQ 31A is connected to the register naming unit 35A to rename speculative registers for speculative instructions that are issued. The XIQ 31B is connected to the register naming unit 35B to rename speculative registers for speculative instructions that are issued. Each register renaming unit 35 consists of a register free list (RFL) 36, a register alias table (RAT) 37, and an architectural register table (ART) 38. In the below description the reference numbers for the register renaming units 35A and 35B are referred to using only reference numeral 35 and instruction queues 31A and 31B are referred to using only reference numeral 31 to simplify the explanation. In one embodiment, an instruction set architecture has 32 architecture registers and 8 speculative registers for a total of 40 physical registers, referred to as the register file 60. The temporary registers are allocated to the RFL 36 of the register renaming units 35. The architectural registers from the instructions are mapped into the physical register file 60 which the issue and execute pipelines of the microprocessor 10 use to execute instructions based on the registers in register file 60. In the above-described embodiment, register scoreboard 40 keeps the write time and read time for the 40 physical registers. The register scoreboard 40 is associated with the physical register file 60. The RFL 36 of each register renaming unit 35 keeps track of temporary registers which have not been used. As the destination register of a speculative instruction is renamed, a free-list register is used for renaming. The register alias table 37 stores the latest renamed registers of the architectural registers. It should be understood that renaming is for the destination registers of the speculative instructions but is used by all instructions. For example, if R5 of a load instruction is renamed to R34, then R34 in the RAT 37 will be seen by an ALU instruction that uses R5 as the source register. Further by way of example, if register R5 is renamed to be temporary register R38, then the register alias table 37 stores the renaming of R5 to R38. Thus, any source operand which references to R5 will see R38 instead of R5. As the architectural register R5 is renamed to R38, eventually when register R38 is retired, the architectural register R5 becomes R38 as stored in the architectural register table 38 and register R5 is released to the RFL 36. The register scoreboard 40 indicates the earliest time for availability of a register of the register file 60. As a speculative instruction is issued from either the LIQ 31A or XIQ 31B, the destination register is renamed but at different times. The speculative instruction in LIQ 31A is issued when all valid source operands can be read while the XIQ 31B must wait for in-order signals from the re-order buffer 45.

In one embodiment, the store instruction has 2 micro-operations: (1) to calculate the store memory address and access the tag array for cache hit/miss and to ensure that there is no possibility of an exception, and (2) store data to memory which could be a cache or external memory. The second micro-operation must be processed in order but it is the same as arithmetic instructions which cannot cause misprediction. There are 3 types of instructions in the re-order buffer 45: (i) speculative instructions, (ii) non-speculative instructions, both as described above and (iii) serialized instructions. The serialized instructions are: (i) software interrupt, (ii) break/debug, (iii) write/read from control and status registers, and (iv) instruction exceptions. When the instruction decode unit 30 encounters a serialized instruction, it stalls the instruction in the instruction decode unit 30 until all previous instructions are completed. The serialized instruction are not normal execution and not impacting the microprocessor performance and will not be discussed any further in the description, as such operations are described in U.S. patent application Ser. No. 17/588,315, filed Jan. 30, 2022, and entitled "Microprocessor with Time Counter for Statically Dispatching Instructions; which application is hereby incorporated by reference in its entirety. The re-order buffer 45 is implemented as a queue with a write pointer to add instructions from the instruction queue 31 and a read pointer to retire the completed instructions. If the read pointer encounters a speculative instruction, then it will stall the re-order buffer 45 until the speculative instruction is complete. If the read pointer encounters a non-speculative instruction, then the re-order buffer 45 retires the instruction and increments the read pointer. At which time, the non-speculative instruction can access the register scoreboard 40, the TRM 50, and the instruction issue unit 55 to issue the instruction to one of the execution queue 70. For example, a stream of instructions comprises: add0, sub0, load1, add1, and1, compare1, branch2, or2, add2, load3, add3, and store4. The LIQ 31A allows the load1, branch2, and store3 instructions to be issued to the execution pipeline as long as these speculative instructions are free of data dependency with available resources. The re-order buffer 45 signals to the XIQ 31B that instructions add0, sub0, and load1 can be issued but other instructions are stalled in the XIQ until load1 is completed. It should be noted here that re-order buffer 45 entry is assigned to each instruction and any non-speculative instructions can be issued only if the ROB read pointer is pointed to it. Once the non-speculative instruction is issued to the execution queue, the re-order buffer 45 does not track the instruction any more. The register scoreboard 40 keeps track of the write time of the destination register of the issued instruction to ensure proper data dependency of all issued instructions.

The branch2 and load3 (address calculation micro-op) instructions can complete execution (by setting the completion bits in the re-order buffer 45) since it was speculatively issued from the LIQ 31A, in which case the re-order buffer 45 signals to the XIQ 31B that all other instructions can be issued to execution pipeline. If the branch2 is not yet completed, then the re-order buffer 45 signals to the XIQ 31B that instructions add1, and1, compare1, and branch2 can be issued. The re-order buffer 45 waits for completion of the branch2 instruction to continue to subsequent instructions. The register rename unit 35A renames destination registers for load1 and load3 instruction. The register rename unit 35B renames the destination register for load1 but if the branch2 is mispredicted, then the register rename unit 35B did not get to the load3 instruction. In this case, the instructions after branch2 are cancelled and the register rename unit 35B is copied to register rename unit 35A, which operates to reverse the register rename unit 35A back to the point of branch misprediction or exception.

In one embodiment, if instructions are executed out-of-order, then the re-order buffer 45 is used to ensure correct program execution. The register renaming unit 35 and the instruction decode unit 30 are coupled to the re-order buffer 45 to provide the order of issued instructions and the latest renaming of all architectural registers. The re-order buffer 45 is needed to retire the instructions in order regardless of when the instructions are executed and written back to the register file 60. In one embodiment, re-order buffer 45 takes the form of a first in first out (FIFO) buffer. Inputs to the re-order buffer 45 are instructions from the decode unit 30 and instructions are retired in order after completion by the functional unit 75 or the load store unit 80. In particular, the re-order buffer 45 flushes all instructions after a branch misprediction or instruction exception. The ART 38 is updated only with instructions before a branch misprediction or instruction exception. Another function of the re-order buffer 45 is writing data to memory only in accordance with the order of the load and store execution. The data memory (including data cache 85 and external memory) are written in order by retiring of the store instructions from the re-order buffer 45, such that regardless of the order of execution of instructions, store operations are performed in order. Retiring of store instructions is performed in order from the store buffer (not shown) in the load store unit 80.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory, tangible, computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory, tangible, computer readable storage medium and include instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

Figure 2:
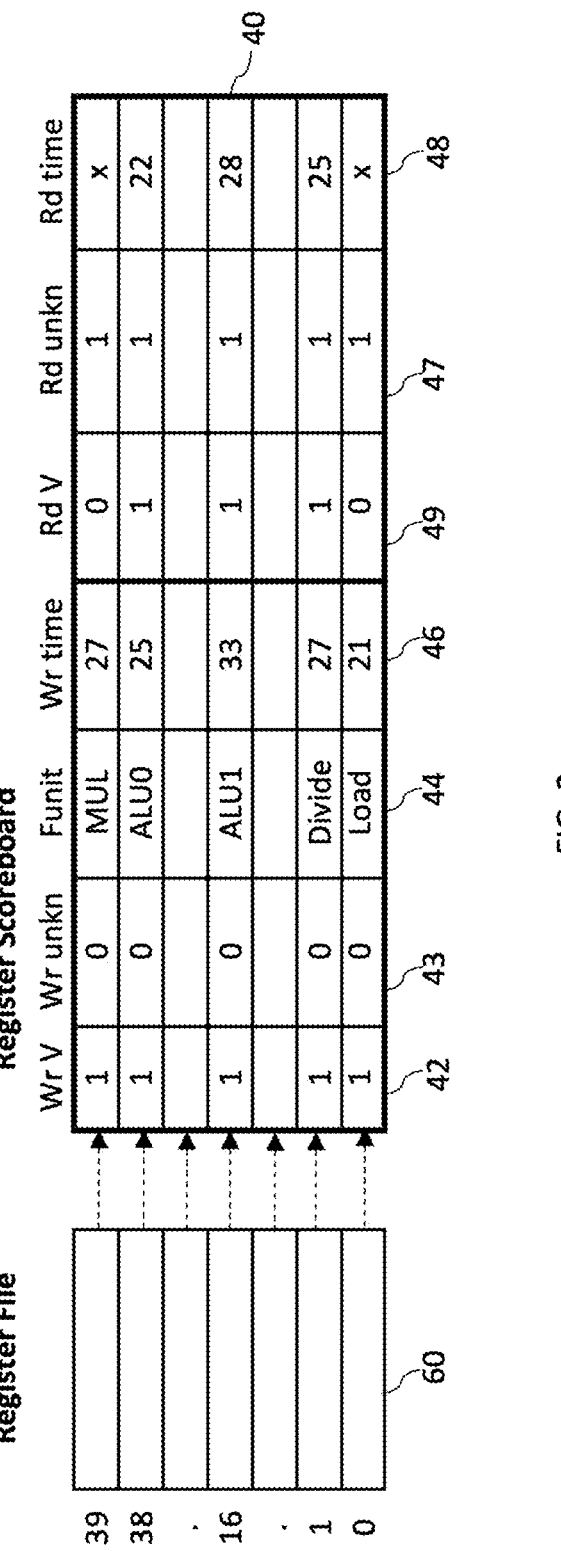
FIG. 2 is a block diagram illustrating a register file and a register scoreboard.

FIG. 2 illustrates further details of the register file 60 and the register scoreboard 40. In one embodiment, the register file 60 has 40 registers comprising 32 architectural registers and 8 temporary registers, numbered as registers 0 to 39 as illustrated. Each register in the register file 60 has a corresponding entry in the register scoreboard 40. The register scoreboard 40 stores the pending read and write statuses for the registers 60. A valid bit field 42 indicates a valid write back to the register file 60 at a future time in reference to the time count 90, as specified by the write time field 46 from a specific functional unit in the "Funit" field 44. If the write time is not known due to the uncertainty of the contents of the data cache 85, then the write unknown bit 43 is set. In an embodiment, the instruction is stalled in decode unit 30 if the unknown bit 43 is set for the source register or the destination register of the instruction. As examples, illustrated in FIG. 2, register 0 is written back at time count 21 from the load-store unit 80. Register 1 is written back at time count 27 from the divide unit (one of the functional units 75). Register 16 is written back at time count 33 from the ALU1, (another of the functional units 75), etc. The write time 46 is the time in reference to the time count 90. The result data is written to the register file 60. The data is not available from the register file 60 until the next clock cycle, but the result data can be forwarded from the corresponding functional unit entry 44 in the register scoreboard 40. For example, if the value of the time count 90 is 19, then the load-store unit 80 in one embodiment produces the result data in 2 clock cycles at time count 21 for writing back to the register file 60. In one embodiment, the "Funit" field 44 is 5 bits which accommodate 32 different functional units 75 and load/store unit 80. The number of bits for "Funit" field 44 is configurable in any given design for addition of a predetermined number of functional units.

The write back time from a functional unit 75 is based on the known latency time of an instruction. The latency time of a load instruction is not fixed. The latency time of a load instruction can be unpredictable as the load data may not be in the data cache 85. For a data cache miss, the data must be fetched from external memory as described above. In such a situation, the write back time in the scoreboard 40 for the destination register of a load instruction will no longer be correct. If processor 10 is implemented with a level 2 cache (not shown), then the latency time for a level 2 cache hit can be used to update the register scoreboard 40 to provide an estimated latency time. In one embodiment, the load-store unit 80 has load data buffers to receive data from the external memory (not shown) and to write load data to the register file 60. In another embodiment, the external memory is a local memory (not shown) which has deterministic latency time to be used as the write time for the register scoreboard 40.

In FIG. 2, the register scoreboard 40 includes a valid bit field 49 to indicate a valid read of the register file 60 at a future time in reference to the time count 90, as specified by the read time field 48. If the read time is not known due to the uncertainly of the data cache 85, then the read unknown bit 47 is set. In an embodiment, the instruction is stalled in decode unit 30 if the unknown bit 47 is set for the source register of an instruction. As examples, illustrated in FIG. 2, register 1 is read at time count 25. Register 16 is read at time count 37 and register 38 is read at time count 22. The read time 48 is the time in reference to the time count 90. The loaded source data is read from the register file 60 to be used by a functional unit 75 in the next cycle. The read time is the preset time to read data from the register file 60. The read data from the register file 60 is synchronized with the execution queue 70 to dispatch an instruction to a functional unit 75 or to write to a store buffer (not shown) in the load store unit 80.

The write time of a destination register is the read time for the subsequent instruction with RAW data dependency on the same destination register. Referring back to FIG. 1, the source registers of an instruction in the decode unit 30 access the register scoreboard 40 for the corresponding read times. If the valid bit 42 of a source register is not set (i.e., Wr V=0) in the register scoreboard 40, then the data in the register file 60 can be accessed at any time providing availability of the read buses 66, otherwise the write time 46 of the previous instruction is the earliest time to read the source operand data. The write time 46 is when the result data from the functional unit 75 or the load store unit 80 are on the write bus 68 for writing to the register file 60. The result data from write bus 68 can be forwarded to read bus 66 so that the result data is available on the read bus 66 in the same clock cycle in which it is written to the register file 60. In one embodiment, the "Funit" field 44 indicates which functional unit will write back to the register file 60, and such functional unit can restrict the aforementioned forwarding to the read bus 66 due to the presence of a critical timing path. For example, the data from the data cache is often a critical timing path in which case forwarding by the functional unit is performed, in one embodiment, to only the ALUs. If the issued instruction is multiply, then the write time 46 from load store unit 80 should be incremented by 1 to be used as the read time for the multiply instruction. In such an instance, the multiply instruction reads the data from the register file 60 one cycle after the load data from the prior instruction is written to the register file 60. Forwarding of data from the data cache 85 to the ALU is normal and is the same as forwarding of any functional unit to any functional unit, while forwarding of data from data cache 85 to multiply unit is not allowed. As an example, when the ALU instruction reads the register 0 of the register scoreboard 40 in FIG. 2, the write time 46 of 21 is used as the read time for a subsequent instruction as data can be forwarded from the data cache 85 onto read bus 66. When the multiply instruction reads the same register 0 of the register scoreboard 40 in FIG. 1, the read time of 22 is used to read data from the register file 60 as the data from data cache 85 are written into the register file 60 in cycle 21. This same restriction is kept and does not permit the read control unit 62 to forward the load data from the data cache 85 to the multiply unit.

Because there is no register renaming for in-order instructions in processor 10, the processor must also handle WAW and WAR data dependency. The read time described in the previous paragraph is used to calculate the write time of the instruction based on the latency time of the instruction. The destination register of an instruction is used to access the register scoreboard 40 for the valid write time 46 (write valid bit 42 is set) and the valid read time 48 (read valid bit 49 is set) which must be less than the calculated write time of the instruction. If either the write time 46 or the read time 48 is greater than the calculated write time, then the read time is adjusted to avoid the WAW and WAR data dependency. In one embodiment, if the write unknown bit 43 or the read unknown bit 47 is set, then the instruction is stalled in the decode unit 30.

An instruction reads source operand data at read time, executes the instruction with a functional unit 75 at execute time, and writes the result data back to the register file 60 at write time. The write time is recorded in the write time field 46 of the register scoreboard 40. With 2 source registers, a given instruction selects the later write time, of the two source registers, from the register scoreboard 40 as the read time for the instruction. The read time is further adjusted by the WAW or WAR data dependency if the write time 46 or the read time 48 of the destination register of the instruction is equal or greater than the calculated write time. The execute time is the read time plus 1 where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

As noted above, each instruction has an execution latency time. For example, the add instruction has a latency time of 1, the multiply instruction has a latency time of 2, and the load instruction has a latency time of 3 assuming a data cache hit. In another example, if the current time count is 5 and the source registers of an add instruction receive write time counts from a prior instruction of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write times of an instruction access the time-resource matrix 50 to determine availability of the resources.

Figure 3:
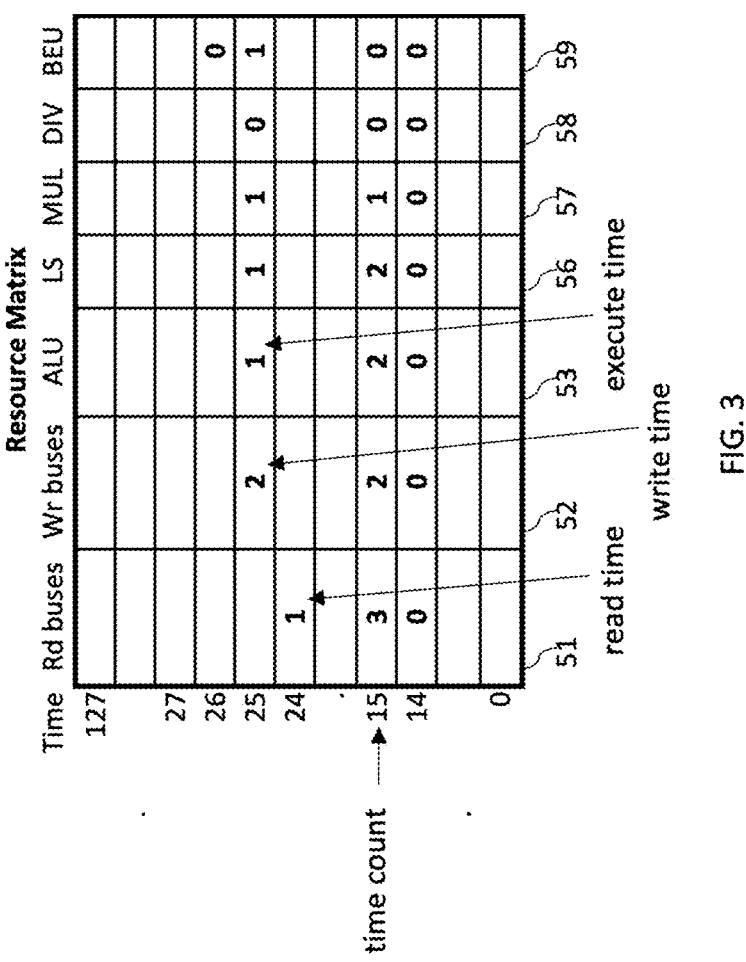
FIG. 3 is a block diagram illustrating a time-resource matrix.

FIG. 3 illustrates further details of the time-resource matrix 50. The time-resource matrix 50 preferably includes the same number of time entries to match, in other words to equal the number of counts before repeating of, the time counter 90. For example, if the time counter 90 is 128 cycles, then the time-resource matrix 50 has 128 entries. In one embodiment, the time counter 90 is incremented every clock cycle and rotates back from the 127th entry to the 0th entry. The columns in the time-resource matrix 50 represent the available resources for the read buses 51, the write buses 52, the ALUs 53, the load-store ports 56, the multiply unit 57, the divide unit 58, and the branch execution unit (BEU) 59. If other functional units are provided by microprocessor 10 those are also included in the resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 each correspond to one of the plurality of functional units 75 of FIG. 1. The load-store ports column 56 corresponds to the load-store unit 80 of FIG. 1.

FIG. 3 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, 1 read bus is busy, at execution time 25, 1 ALU, 1 load-store port, 1 multiply unit, and 1 BEU are taken for execution of previous instructions, and at write time 25, 2 write buses are busy. In one embodiment, the numbers of read buses, write buses, ALUs, load/store ports, multiply unit, divide unit, and BEU are 4, 4, 3, 2, 1, 1, and 1, respectively. If an add instruction with 2 source registers and 1 destination register is issued with read time of 24, execution time of 25, and write time of 25, then the number of read buses 51 at time 24, write buses 52 at time 25, and ALUs 53 at time 25 are incremented to 3, 3, and 2, respectively. The source registers of the add instruction will receive data from read buses 2 and 3, ALU 2 is used for execution of the add instruction and write bus 3 is used to write back data from ALU 2. The counts in the row are reset by the time counter for each time count. As illustrated in FIG. 3, when the time count is incremented from 14 to 15, all resource counts of row 14 are reset. All resource counts of row 15 are reset when the count is incremented to 16 in next cycle. In the embodiment of FIG. 3 resources are assigned to the issued instruction in-order of the resource count. If an issued instruction is a multiply instruction with execution time of 25, since there is only one multiply unit 57, the issued instruction cannot be issued for execution time of 25. In another embodiment, two read times, two execution times, and two write times are used per instruction with expectation that one set of times is free of conflict, increasing the chance for instruction issuance. In another embodiment, the counts indicate the number of available resources, as opposed to the used resources. The resource counts are decremented if the resource is assigned to an issue instruction.

All available resources for a required time are read from the time-resource matrix 50 and sent to the instruction issue unit 55 for a decision of when to issue an instruction to the execution queue 70. If the instruction issue unit 55 determines that the necessary resources are available at the required times, then the instruction can be scheduled and sent by the instruction issue unit 55 to the execution queue 70. The issued instruction causes the register scoreboard 40 to be updated with the write time and the time-resource matrix 50 to be updated to correspondingly reduce the available resource values. All resources must be available at the required time counts for the instruction to be dispatched to the execution queue 70. If all resources are not available, then the required time counts are incremented by one, and the time-resource matrix is checked as soon as the same cycle or next cycle to determine if the necessary resources are available. The particular number of read buses 66, write buses 68, and functional units 75 in FIG. 1 is preferably chosen to minimize stalling of instructions in the instruction issue unit 55.

In one embodiment, each resource represented in the time-resource matrix 50 is implemented as an independent register file where the number of entries is the same as the time counter 90, and each entry consists of a resource count. The issued or replayed instruction accesses individual resources as needed, instead of accessing all resources in the time-resource matrix.

Figure 4B:
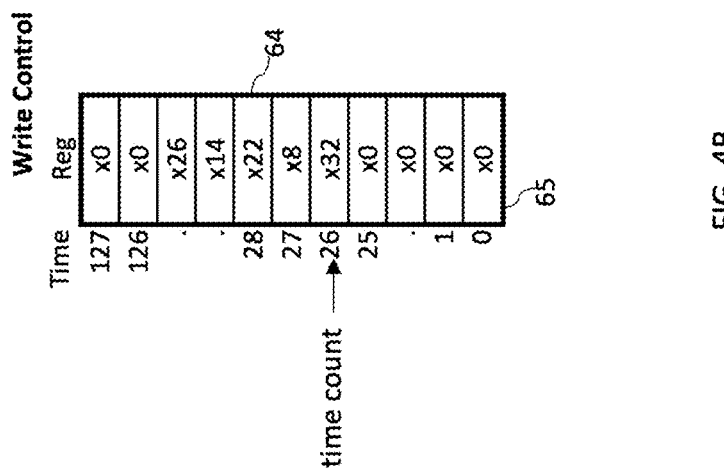
FIGS. 4A and 4B are block diagrams illustrating a read bus control and a write bus control.
Figure 4A:
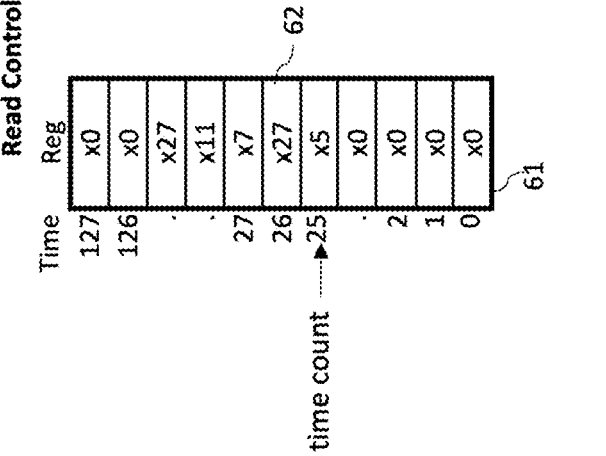

FIG. 4A illustrates operation of a single read bus of the read control unit 62 and FIG. 4B operation of a single write bus of the write control unit 64. The read control unit 62 and the write control unit 64 include a number of time entries that match the time counter 90. As mentioned above, in a preferred embodiment the time count is incremented every clock cycle. The column in the read control unit 62 represents the source register 61. The column in the write control unit 64 represents the destination registers in the write bus 65. In one embodiment, microprocessor 10 uses the RISC-V instruction set architecture. In that architecture register 0 (x0) is not a real register; reading of register x0 returns 0 and writing to register x0 is ignored. The x0 register is used as an invalid read and write to the register file 60. If a different instruction set architecture is used, then the read control unit 62 and the write control unit 64 can include another column of valid bits (not shown) to indicate a valid read or write, respectively. In FIGS. 4A and 4B, when the time count is incremented from 25 to 26, the register fields 61 and 65 of row 25 will be reset to x0. The register fields 61 and 65 of row 26 are reset to x0 when the count is incremented to 27 in next cycle. FIGS. 4A and 4B show operation of a single read bus 66 and a single write bus 68, respectively. If, however, 4 read buses and 3 write buses are implemented, then the operations shown in FIGS. 4A and 4B are duplicated 4 times and 3 times, respectively.

In the example illustrated in FIG. 4A, at the time count of 25 the register x5 from the register field 61 of the read control 62 is used to read the entry 5 from the register scoreboard 40 for the valid bit 42, the "Funit" 44, and the write time 46. If the valid bit 42 is set and the write time 46 is equal to the time count 90, then the data is forwarded from the "Funit" 44 instead of reading from the register file 60. If the valid bit 42 is reset, then the data is read from the register file 60. If the valid bit 42 is set, and the write time 46 is greater than the time count 90, then the instruction is replayed where the write time 46 is the read time for the replay instruction. The replay instruction will access the time-resource matrix 50 to reissue the instruction to the replay execution queue. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from potentially hundreds of instructions in dynamic scheduling. Similarly, in FIG. 4B, the register x32 from the register field 65 of the write control unit 64 at time count of 26 is used to write to the register file 60. The register x32 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

Figure 5:
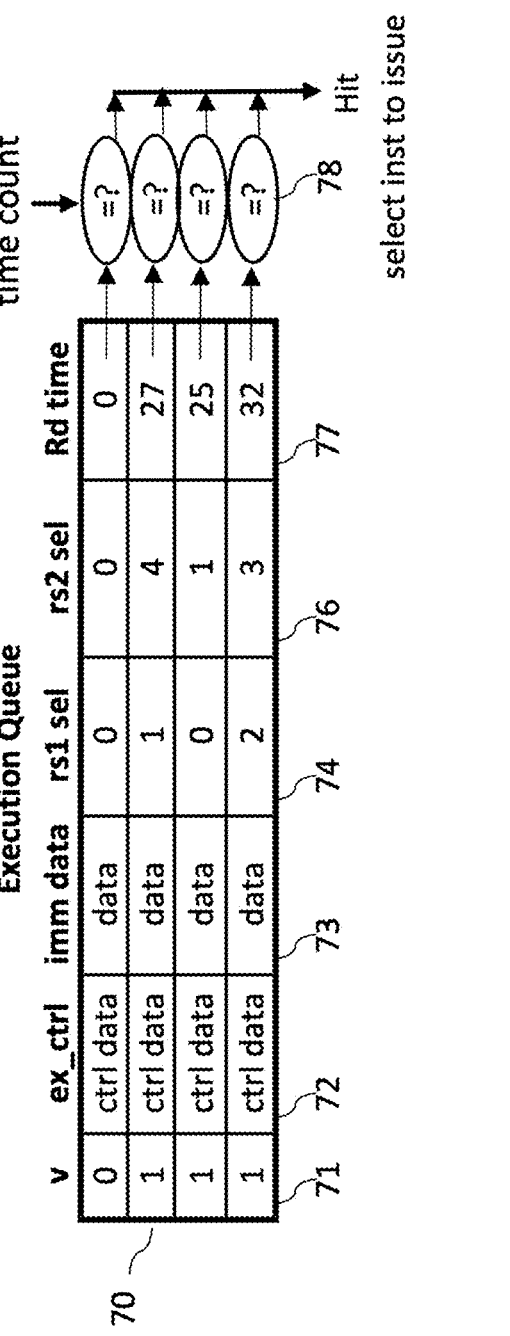
FIG. 5 is a block diagram illustrating an execution queue.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, and the read time 77. The valid bit 71 indicates that the entry is valid in the execution queue 70. The control data 72 specifies the specific operation to be executed by the functional units 75 or the load/store unit 80. The immediate data 73 is an alternative to the second source register for the instruction. In one embodiment, a valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74, and 76 may not be used for some instructions.

Note that the destination register can be but does not need to be kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 5, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions. This case further includes sharing of functional units between the speculative and in-order instructions. In another embodiment, the speculative and in-order functional units have independent speculative and in-order execution queues.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. The invention is not limited to integer functional units. In other embodiments the functional units include floating point units, digital-signal processing units, processing units, or in-order designed units.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:

a time counter storing a time count representing a current time of the processor, wherein the time count is incremented periodically;

a register renaming unit comprising, a register free list that identifies a plurality of temporary registers wherein a first temporary register is used to rename a first destination register of a first speculative instruction;

a register alias table that identifies for each architectural register of the processor wherein the first destination register is renamed to the first temporary register at issuance of the first speculative instruction;

an architectural register table that identifies each architectural register of the processor wherein the first destination register is renamed to the first temporary register at retiring of the first speculative instruction and wherein a previous renamed register of the first destination register is released to the register free list as a temporary register;

an instruction issue unit that is coupled to the time counter and receives the first speculative instruction and wherein the first destination register of the first speculative instruction is renamed with the first temporary register of the register free list;

a register scoreboard coupled to the time counter and the instruction issue unit and the register renaming unit to record a write back time of the first temporary register;

a first execution queue coupled to the time counter and the instruction issue unit to receive the first speculative instruction from the instruction issue unit, and dispatch the first speculative instruction to a first functional unit at a first preset execution time that corresponds to a first time count and wherein the first functional unit writes a result data to the first temporary register of a register file;

wherein the instruction issue unit receives a second non-speculative instruction and issues the second non-speculative instruction wherein a second destination register of the second non-speculative instruction references a renamed register from the register alias table and wherein the second non-speculative instruction is issued to the execution queue when the second non-speculative instruction cannot be cancelled;

a read control unit having registers storing time count entries specifying when operands may be read and transported on a read bus, and wherein the read control unit further accesses the register scoreboard to determine availability of a first register in a register file, wherein if a write time of the first register is the same as the time count then data is forwarded instead of being read from the register file; and a write control unit having write bus control registers storing time count entries specifying when result data may be transported on a write bus and written to a second register of the register file, and wherein the write control unit further accesses the register scoreboard to clear a valid bit if a write time stored in a write bus control register of the write bus control registers is the same as the time count.

2. The processor of claim 1 wherein the first speculative instruction takes the form of one of a branch instruction, a load instruction, and a store instruction.

3. The processor of claim 2 further comprising:

a re-order buffer that tracks for all decoded instructions, an order of the decoded instructions, a corresponding instruction type of each decoded instruction, and completion status of each decoded instruction;

wherein the instruction type includes speculative and non-speculative instructions.

4. The processor of claim 3 further comprising:

a clock circuit, wherein the time counter increments the time count with each clock cycle of the clock circuit;

wherein the time counter comprises an N-bit counter wherein an N-bit count value represents a largest future time for the instruction issue unit to issue a first instruction wherein the N-bit counter returns to a zero count after reaching the N-bit value;

the register scoreboard storing a write time, corresponding to the first instruction, of a first register in a register file, wherein the write time corresponds to a future time of the time count;

an instruction decode unit coupled to the register scoreboard, wherein the instruction decode unit reads at least one write time for source operands of the first instruction from the register scoreboard, and uses the at least one write time to determine an execution time for the first instruction; and a time-resource matrix unit comprising a plurality of the time-resource registers for storing information relating to available resources for each time count of the N-bit time counter, and wherein the resources include at least one of: a plurality of read buses, a plurality of write buses, and a plurality of each type of functional units.

5. The processor of claim 4 wherein the register scoreboard stores a read time, corresponding to a second instruction of a second register in the register file, wherein the read time corresponds to a future time of the time count.

6. The processor of claim 1 wherein at least the first execution queue stores a plurality of instructions, wherein each instruction of the plurality of instructions includes a read time which is represented by a future time count wherein at least the first execution queue dispatches instructions to at least one functional unit and wherein the read control unit is synchronized with a read time in the first execution queue.

7. The processor of claim 1 further comprising:

an instruction decode unit that determines if a selected instruction is a speculative instruction, and if the selected instruction is a speculative instruction then renames a first destination register for the selected instruction, and if the selected instruction is a non-speculative instruction then identifies a renamed register, as determined by the register renaming unit, as a second destination register.

8. The processor of claim 1 wherein the register scoreboard also records a read time and write back time of destination registers for non-speculative instructions.

9. The processor of claim 1 wherein a non-speculative instruction is only executed in-order.

10. A processor comprising:

a clock circuit;

a time counter storing a time count representing a specific time of operation of the processor, wherein the time count is incremented by the clock circuit;

a plurality of architectural registers;

a first register renaming unit comprising a register free list for temporary registers, each temporary register used to rename a destination register of a first speculative instruction, a register alias table that tracks register renaming of the architectural registers upon issuance of a speculative instruction, and an architectural register table that tracks register renaming of the architectural registers upon retiring an instruction;

a second register renaming unit that renames a destination register of a second instruction wherein contents of the second register renaming unit are copied to the first register renaming unit if the first speculative instruction encounters a branch misprediction or an exception;

a register scoreboard coupled to the time counter to record a write back time of a destination register and a read time of a source register referenced by the first speculative instruction;

a time-resource matrix coupled to the register scoreboard and the time counter for storing information relating to available resources for each time count of the time counter;

a first execution queue coupled to the time counter and an instruction issue unit to receive the first speculative instruction from the instruction issue unit, and dispatch the first speculative instruction to a first functional unit when the first preset execution time corresponds to the time count;

wherein the instruction issue unit receives a second non-speculative instruction and issues the second non-speculative instruction wherein a second destination register of the second non-speculative instruction is not renamed by a temporary register from the register free list and references a renamed register from the register alias table and wherein the second non-speculative instruction is issued to the execution queue when the second non-speculative instruction cannot be cancelled by the first speculative instruction; and a re-order buffer that keeps track of order of all instructions, instruction type of all instructions, the instruction type including speculative and non-speculative, and completion status of all instructions.

11. A computer program product stored on a non-transitory computer readable storage medium and including computer system instructions for causing a computer system to execute a method that is executable by a processor, the method comprising:

issuing a first speculative instruction to a first execution queue at a first future time and issuing a second non-speculative instruction to a second execution queue upon determination that the second non-speculative instruction cannot be cancelled by the first speculative instruction; and renaming with a first register renaming unit a first destination register corresponding to the first speculative instruction and not renaming a second destination register corresponding to the second non-speculative instruction.

12. The computer program product of claim 11 wherein the method further comprises:

tracking for all decoded instructions an order of the decoded instructions, a corresponding instruction type of each of the decoded instructions, and completion status of each of the decoded instructions, wherein the instruction type includes speculative and non-speculative instructions.

13. The computer program product of claim 12 wherein the method further comprises:

storing a write time and a read time of a first register of a register file wherein the write time and read time are future times defined by a time count.

14. The computer program product of claim 13 wherein the method further comprises:

storing in a register of a read control unit a read time that specifies when data may be read from the register file and transported on a read bus;

storing in a register of a write control unit a write time that specifies when result data may be transported on a write bus and written to a second register of the register file;

storing a plurality of instructions in an execution queue, wherein each instruction includes a read time defined by the time count; and synchronizing the read time of the execution queue with the read time of the read control unit.

15. The computer program product of claim 14 wherein the time count is generated by a time counter that provides a maximum time count corresponding to a latest future time to issue an instruction.

\* \* \* \* \*